United States Patent Office 3,795,634
Patented Mar. 5, 1974

3,795,634
VINYL CHLORIDE FOAM CONTAINING
SILICONE POLYMERS
John M. Nielsen, Scotia, N.Y., assignor to
General Electric Company
No Drawing. Filed May 3, 1972, Ser. No. 250,034
Int. Cl. C08j 1/18, 1/20
U.S. Cl. 260—2.5 P                              17 Claims

ABSTRACT OF THE DISCLOSURE

Composition for producing foams containing vinyl chloride polymer, plasticizer and reaction products of certain silicones with an ether having the formula:

$$ZO(C_nH_{2n}O)_fR^2$$

wherein Z is H, or $CH_2=CHCH_2-$, or

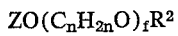

$R^2$ is lower alkyl radical; $f$ has a value of at least 4; $n$ has a value of from 2 to 4, inclusive; and $p$ is 0 to 18.

BACKGROUND OF THE INVENTION

The present invention relates to vinyl chloride plastisol compositions which can be chemically blown to produce a foam and, in particular, to vinyl chloride plastisol compositions having a silicone polymer therein.

Vinyl chloride polymer compositions containing plasticizers have been foamed to provide cellular structures employing various blowing agents that generate vapor within the composition. The blowing agent releases a gas in the composition under preselected conditions, and usually makes it possible to obtain foams of lower densities than foams obtained by mere mechanical frothing.

The quantity of blowing agent in a particular plastisol system must be carefully controlled and is limited by the amount of gas or vapor which the particular foam structure can retain. Accordingly, a problem existent when chemically blowing foams is commonly referred to as "over blowing." That is, when the quantity of blowing agent exceeds the capacity of the foam structure to hold the gas generated by available blowing agent, a uniformly celled foam can be converted to an irregularly celled mass by the breakdown of cell walls and by the escape of the blowing agent products.

It is therefore an object of the present invention to provide a silicone polymer additive for vinyl chloride plastisols that will permit the plastisol to be chemically blown in the "hot melt" stage at atmospheric pressure to an improved degree, and particularly to densities below 10 lb./ft.³. The hot melt stake is the condition reached following gelation and fusion of the plastisol.

It is another object of the present invention to provide a silicone polymer additive for vinyl chloride plastisols that will aid in the control of the size and uniformity of the cells at "overblown" as well as "pre-overblown" conditions of a plastisol system. Another object of the present invention is to provide plastisol compositions which exhibit good flow characteristics.

SUMMARY OF THE INVENTION

The present invention is concerned with compositions which can be chemically blown to produce foams which comprises a vinyl chloride polymer, a plasticizer uniformly mixed with said vinyl chloride polymer and a silicone polymer uniformly mixed with said vinyl chloride polymer and said plasticizer; wherein said silicon polymer is the reaction product of (A) silicone reactant selected from the group of (1)  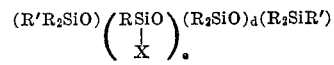

and (2)  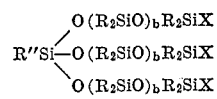

wherein X is selected from the group of H, and $$(CH_2)_aCOOH$$

$R^1$ is the same as X or is a monovalent organic radical provided that Formula 1 contains at least three H or $(CH_2)_aCOOH$ units directly bonded to Si atoms, wherein each R and R" individually is a monovalent organic radical; $a$ is an integer from 2 to 20, inclusive; $b$ has a value of at least 2; $d$ is an integer from about 5 to about 200, inclusive; $e$ is at least 1, and the ratio of $e/d$ is about 0.002 to about 0.3; with (B) an ether having the formula:

$$ZO(C_nH_{2n}O)_fR^2$$

wherein Z is H when X is $(CH_2)_aCOOH$, and is $$CH_2=CHCH_2-$$

or

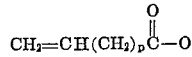

when X is H; $R^2$ is lower alkyl radical; $f$ has a value of at least 4; $n$ has a value of from 2 to 4; inclusive; and $p$ is 0 to 18.

DESCRIPTION OF PREFERRED EMBODIMENTS

A plastisol such as that used in the present invention is a two-phase system in which a vinyl chloride polymer is small particulate form is dispersed in a plasticizer which has little solvating action for the polymer at room temperature but will dissolve the polymer at an elevated temperature and cause the mixture of the plasticizer and the polymer to fuse into a plasticized structure. Many different types of vinyl chloride polymers may be used such as vinyl chloride homopolymer or a copolymer of vinyl chloride with other ethylenically unsaturated monomers, or a mixture of the homopolymer with other vinyl chloride copolymers. The vinyl chloride polymers generally have at least 60% by weight of polymerized vinyl chloride and preferably 85 to 100% by weight.

The copolymers are formed by polymerizing vinyl chloride with ethylenically unsaturated monomers such as lower alkyl unsaturated esters which include vinyl acetate, partially hydrolyzed vinyl acetate and vinyl benzoate; lower alkyl acrylates which include methyl acrylate, ethyl acrylate, butyl acrylate, and octyl acrylate, and the corresponding methacrylates; alkyl esters of unsaturated acids such as maleic and fumaric acids and diethyl maleate, as well as other copolymerizable compounds such as unsaturated nitriles which include acrylonitrile; halogenated hydrocarbons which include vinylidene chloride and fluoride, vinyl fluoride, chlorotrifluoroethylene, and other polymerizable compounds containing ethylenic unsaturation. The preferable copolymers are the vinyl chloride-vinylacetate copolymers, particularly those containing 85% by weight or more of vinyl chloride polymerized therein.

Typical vinyl chloride polymers which include vinyl chloride homopolymer dispersion grade resins and vinyl acetate-vinyl chloride copolymers are Opalon 400, 410, 440, R–7611, and 3142 manufactured by Monsanto Chemical Company, Springfield, Mass.; Tenneco 1755 and 0565 manufactured by Tenneco Chemicals, Inc., East Brunswick, N.J.; Diamond 74, 71, 7602 and 7401 manufactured by the Diamond Shamrock Chemical Company, Cleveland, Ohio; Geon 121, Geon 130×10, Geon 120 ×241 and Geon 135 manufactured by the B. F. Goodrich Chemical Co., Cleveland, Ohio; Exon 6338 and 605 manufactured by Firestone Plastics Co., Pottstown, Pa.; Marvinol VR–50, 51, 53, 56 and 57 manufactured by Uniroyal Chemical Co., Naugatuck, Conn.; GYLF-Z manufactured by the Union Carbide Corporation; and VC–2605 manufactured by the Borden Chemical Co. About 30 to 40% by weight of these total vinyl chloride polymers added to form the plastisol may include a large particle size or blending resin such as Marvinol VR–10, 15, 24; Borden's VC–2605 and 260S manufactured by the Borden Chemical Company; Diamond's 744 and 7442 manufactured by the Diamond Shamrock Chemical Co.; Firestone's XR 2316 and XR 2322 manufactured by the Firestone Plastics Co.; Geon 106F2 manufactured by the B. F. Goodrich Chemical Co.; Marvinol 14 manufactured by Uniroyal Chemical Co., Naugatuck, Conn.; and MC–85 manufactured by the Goodyear Tire and Rubber Co., Akron, Ohio. These polyvinyl chloride blending resins lower the viscosity of the resulting plastisol for a given weight percent of polyvinyl chloride. However, a primary reason for their addition to small size vinyl chloride polymer resin is their cheapness in comparison to the small sized vinyl chloride dispersion resins. Thus, by substituting a certain amount of the blending resin for dispersion resin, the cost of the resulting plastisol can be reduced as well as the viscosity. It is also to be noted that the surfactant used to manufacture a particular resin will affect the foamability of the resin in plastisols and that as a result, certain of the above vinyl chloride resins produced with certain surfactants can give better foams at low density with silicone polymer additives. The vinyl chloride resin generally comprises about 40–65% by weight of an unfilled and unpigmented plastisol composition.

The liquid plasticizer is used in varying amounts depending upon the resin employed and the desired properties of the final product. Typical plasticizers include di-octyl phthalate, dihexyl phthalate, diisodecyl phthalate, butyldecyl phthalate, diisooctyl phthalate, n-octyldecyl phthalate, dicapryl phthalate, isooctylisodecyl phthalate, butylcyclohexyl phthalate, di-2-ethylhexylhydrophthalate, trioctyl phosphate, tricesyl phosphate, di-(2-ethylhexyl) adipate, di(2-ethylhexyl) azelate, dioctyl sebacate; diisodecyl adipate, butylbenzyl phthalate, butyloctyl phthalate, dodecyl phthalate, trioctyl trimellitate, n-octyl-n-decyl trimellitate, triisooctyl trimellitate, dipropyl glycol dibenzoate. Polymeric plasticizer may also be used such as Nuoplax 1046 manufactured by the Nuodex Co., Paraplex G–54, G–62 manufactured by Rohm & Haas Co., Santicizer 140, 148 and 462 manufactured by the Monsanto Chemical Co., Staflex 347 manufactured by the Reinhold Chemical Co., epoxy-type of plasticizers such as Monoplex S–73, S–74 and S–75 manufactured by Rohm & Haas Co., Admex 752 manufactured by Ashland Oil, Inc.; Emery 12706–40–R manufactured by Emery Industry, Inc., and Fleximore 50–T manufactured by Rohm & Haas Co. Other plasticizers are Kodaflex CB–2, Kodaflex DOA, Kodaflex DOZ, Kodaflex DBS manufactured by Eastman Chemical Co., Kingsport, Tenn., Benzoflex 9–88 manufactured by Velsichel Chemical Co., Chattanooga, Tenn., HB–40 manufactured by Monsanto Chemical Co., St. Louis, Mo. The above is just a sample of the many plasticizers that can be used to form the vinyl chloride plastisol. The plasticizer generally comprises about 25–50% by weight of an unfilled and unpigmented plastisol composition.

The silicone polymers which are employed in the present invention are ester or ether reaction products of (A) silicone reactant selected from the group of (1) 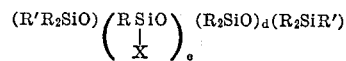

and (2) 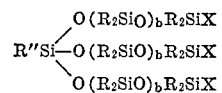

wherein X is selected from the group of H, and

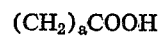

R' is the same as X or is a monovalent organic radical, provided that Formula 1 contains at least three H or $(CH_2)_aCOOH$ units directly bonded to Si; wherein each R and R'' individually is a monovalent organic radical; $a$ is an integer from 2 to 20, inclusive; $b$ has a value of at least 2; $d$ is an integer from about 5 to about 200, inclusive; $e$ is at least 1, and the ratio of $e/d$ is about 0.002 to about 0.3; with (B) an ether having the formula:

(3) $\quad ZO(C_nH_{2n}O)_fR^2$ wherein Z is H when X is $(CH_2)_aCOOH$, and is

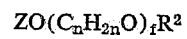

or

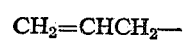

when X is H; $R^2$ is lower alkyl radical; $f$ has a value of at least 4; $n$ has a value of from 2 to 4, inclusive; and $p$ is 0 to 18.

At least 50% of the available reactive H or COOH groups of the silicone reactants of Formulas 1 and 2 are reacted with the ethers of Formula 3, and preferably at least 80% are reacted. In addition, it is most preferred that all of the reactive H or COOH groups of the silicone of Formulas 1 and 2 are reacted with the ether of Formula 3.

The organic radicals represented by R and R'' include monovalent hydrocarbon radicals and substituted hydrocarbon radicals such as halogenated monovalent hydrocarbon radicals. Thus, the radical R may be alkyl, such as methyl, ethyl, propyl, butyl, octyl, etc. radicals; aryl radicals such as phenyl, tolyl, xylyl, naphthyl, etc. radicals; aralkyl radicals, such as benzyl, phenylethyl, etc. radicals; cycloalkyl radicals such as cyclohexyl, cycloheptyl radicals, etc.; halogenated monovalent hydrocarbon radicals of the above-mentioned types such as dichloropropyl, 1,1,1-trifluoropropyl, chlorophenyl, dibromophenyl, chloromethyl, etc. radicals and minor amounts of cyanoalkyl radicals such as cyanoethyl, cyanopropyl, etc. Preferably the radicals represented by R and R'' have less than 8 carbon atoms and in particular it is preferred that R and R'' be methyl, ethyl, or phenyl.

Each R' in Formula 1 individually has the same meaning as X or is a monovalent organic radical as defined above for R. Preferably R' is the same as X.

$a$ of Formulas 1 and 2 is an integer from 2 to 20, inclusive, and preferably is 2 or 3.

$d$ of Formula 1 is an integer from about 5 to about 200, inclusive; and preferably is from about 6 to about 100.

$e$ of Formula 1 is at least 1, and preferably is an integer from about 1 to about 20, inclusive.

$p$ of Formula B is an integer from 1 to 18 or 0.

In addition, the ratio $e/d$ is about 0.002 to about 0.3 and preferably is about 0.005 to about 0.2.

$b$ in Formula 2 is at least 2 and preferably is from about 2 to 40 or more.

A suitable method for preparing silicone polycarboxylic acids within the scope of Formula 1 comprises reacting in the presence of water a diorganopolysiloxane of the formula (4)  $R_2^3SiT_2$ with a cyanochlorosilane of the formula (5)  $R^3Si(T_2)C_gH_{2g}CN$ and a silane of the formula (6)  $(R^4R_2^3SiT$ wherein $R^3$ is selected from monovalent hydrocarbon radicals and halogenated monovalent hydrocarbon radicals. $R^4$ is the same as $R^3$ or is —$C_gH_{2g}CN$; T is a hydrolyzable radical selected from halogen, alkoxy, aryloxy, and acyloxy radicals; $g$ is a whole number that varies from 2 to 20, and preferably is 2 or 3.

The carboxy polysiloxanes may also be prepared by taking the silanes of Formula 4 and Formula 5 separately and hydrolyzing and condensing to form the corresponding polysiloxanes. The corresponding polysiloxanes may then be equilibrated with an appropriate disiloxane as a chain-stopper to form the desired polysiloxane having carboxy groups thereon. The equilibration of the polysiloxanes and the disiloxanes preferably is carried out in the presence of an acid to form the desired acid polysiloxane.

The diorganosilanes of Formula 4 are preferably ones in which T is equal to chlorine or equal to another type of halogen. However, it is to be understood in the present invention that T may be also represented by an acetoxy, aryloxy, alkoxy or an acyloxy hydrolyzable radical. Such diorganosilanes are well known in the art. The silanes of Formula 5 are also well known in the art.

The cyanosilanes of Formula 5 may be prepared by various methods which are known in the art. One method of producing the nitrile silane of Formula 5 and the nitrile silane of Formula 6 when there is a nitrile group attached thereto is to react an olefinic cyanide with the alkylhydrochlorosilane in the presence of a three component catalyst system disclosed in Bluestein U.S. Pat. 2,971,970.

Illustrative of the diorganohalogensilanes within the scope of Formula 4 are dimethyldichlorosilane, methylphenyldichlorosilane, diphenyldichlorosilane, ethylpropyldichlorosilane, etc. Products within the scope of Formula 5 include for example, methyl-beta-cyanoethyldichlorosilane, phenyl - beta - cyanoethyldichlorosilane, phenyl-gamma - cyanopropyldichlorosilane, cyano - hexyl - beta-cyanopropyldichlorosilane. The cyanodiorganochlorosilanes of Formula 5 are characterized by the fact that the nitrile group is attached to a carbon atom which is at least one carbon atom removed from the silicon atom. For example, the cyano group is beta or gamma with respect to the silicon atom. Silanes which come within the scope of Formula 6 are as follows: trimethylchlorosilane, dimethylphenylchlorosilane, dimethyl - beta - cyanoethylchlorosilane, and diphenyl - gamma - cyanopropylchlorosilane.

To form the carboxy polysiloxanes within the scope of Formula 1, the diorgano hydrolyzable silane of Formula 4, the cyano hydrolyzable silane of Formula 5 and the silane of Formula 6 are mixed together in the proportion that the siloxy groups appear in the polysiloxane. This mixture is then slowly added to water to facilitate the hydrolysis and condensation of the silicon-bonded halogen hydrolyzable atoms and the hydrolysis of the nitrile groups to carboxyl groups. In general, the amount of water employed in the hydrolysis and condensation reaction is sufficient to hydrolyze all the silicon-bonded hydrolyzable atoms and also sufficient to provide a solvent for the acid which may result from the hydrolysis, which may be hydrogen chloride assuming that the hydrolyzable radical is chlorine. Preferably, the amount of water is maintained at a value sufficiently low to provide a concentrated hydrogen chloride solution or other acid solution or even so low as to be insufficient to dissolve all of the acid formed. Where the amount of water is insufficient to dissolve the acid generated, it is desirable to maintain the reaction mixture under pressure, such as a pressure of about 50 lbs./in.² so as to avoid loss of the acid. In general, the amount of water employed is from about 0.75 to about 1.25 parts per weight of the mixture of the three hydrolyzable silanes of Formulas 4, 5 and 6. The hydrolysis and condensation reaction is found to be exothermic and it is found that the temperature increases to within a range of 25° to 100° C. and preferably to a maximum in the range of about 70° C. during the course of the hydrolysis and condensation, which is effected in the period of time of about generally 1 to 8 hours and preferably 1 to 6 hours. After completion of the hydrolysis and condensation reaction, water and acid are stripped to yield a reaction mixture containing the precipitate of ammonium halide from the hydrolysis of the nitrile group to the carboxy group. This precipitate is filtered and the reaction mixture is then dried. In order to insure a uniform composition, the dried and filtered hydrolyzate is equilibrated with sulfuric acid. The conditions under which this equilibration is effected can vary within extremely wide limits. In general, satisfactory results are obtained by adding from about 1 to 5% by weight of 86% to 96% by weight of sulfuric acid to the hydrolyzate and heating the reaction mixture at a temperature of from about 70° to 125° C. for a period of time from about 1 to 6 hours, and preferably 1 to 3 hours. At the end of this time, the reaction mixture is cooled and washed with water until the wash water is neutral. This results in the carboxypolysiloxane included by Formula 1.

The carboxypolysiloxane included by Formula 1 may also be obtained by an alternate procedure. Assuming the hydrolyzable radical in Formulas 4, 5, and 6 is chlorine. such polysiloxanes can be produced by following the procedure involving the hydrolysis of one or more of the above hydrocarbon-substituted chlorosilanes, in which the substituents consist of saturated hydrocarbon groups which compounds of Formulas 4, 5 and 6 are first hydrolyzed separately. The silane of Formula 6, when hydrolyzed and condensed will produce a disiloxane as is well known in the art. The silane of Formula 4 is hydrolyzed separately to produce a mixture of linear and cyclic polysiloxanes. This crude hydrolyzate is then polymerized by treatment with KOH and being heated at elevated temperatures to form a mixture of low boiling, low molecular weight cyclic polymers, having the formula:

(7)  $(R_2^3SiO)_h$ where $h$ is a whole number varying from 3 to 10. The crude hydrolyzate containing the above cyclics may contain undesirable materials such as monofunctional and trifunctional chlorosilane starting material. The hydrolyzates of cyclic and linear siloxanes are fractionally distilled and there is collected a pure product containing low boiling, low molecular weight cyclic polymers free of any significant amount of monofunctional and trifunctional groups.

Because of the nitrile group, when the hydrolyzate of the chlorosilane of Formulas 5 or 6 containing nitrile is prepared, it is required that a strong acid be utilized as the catalyst to hydrolyze the nitrile group to a carboxy group. When T is chlorine, hydrochloric acid is provided directly for this hydrolysis. The separate hydrolyses of (5) and (6) which contain nitrile are carried out similarly to the previously described mixed silane hydrolysis to give a dicarboxydisiloxane (8) from (6) and a polycarboxypolysiloxane from (5). The latter requires the use of a solvent such as dioxane to mobilize the viscous product. These separately prepared siloxanes which are prepared in accordance with the above procedures are then mixed in the desired proportions in the reaction vessel and are subjected to an equilibration reaction to form the carboxypolysiloxane within the scope of Formula 1. The correct proportion of disiloxane (8) $[R^5R_2^3Si]_2O$, where $R^5$ is $R^3$ or $-C_gH_{2g}COOH$ is added as a chain-stopper to limit the chain length of the polysiloxanes formed. The reaction mixture can then be equilibrated to form the carboxypolysiloxane within the scope of Formula 1.

In order to carry out the equilibration reaction, there must be added to the reaction mixture a strong acid catalyst such as sulfuric acid, toluene sulfonic acid and other acids. It is preferred to use a strong acid, such as toluene sulfonic acid, as the catalyst in order to help preserve the carboxy group in the polysiloxane product. Functional compounds that may be employed satisfactorily for controlling polymer growth within the scope of the disiloxane of Formula 8 include among others hexamethyldisiloxane,
tetramethyldiphenyldisiloxane,
bis(β-carboxyethyl)tetramethyldisiloxane,
bis(β-carboxyethyl)tetramethyldisiloxane,
bis(β-carboxyethyl)dimethyldiethyldisiloxane,
bis(β-carboxyethyl)tetraethyldisiloxane and
bis(γ-carboxypropyl)tetramethyldisiloxane.

The equilibration reaction is carried out from 2 to 4 hours until about 85% or more of the cyclic diorganosiloxanes have been converted to polymers end-stopped with monofunctional groups, a process well known to the art. When this equilibrium point has been reached, there are just as many polymers being converted to cyclic siloxanes as there are cyclic siloxanes being converted to the polymer. At that time there is added to the mixture a sufficient amount of a base such as sodium bicarbonate that will neutralize the toluene sulfonic acid so as to terminate the polymerization reaction. The low molecular weight reactants that are left can then be distilled off to leave the carboxypolysiloxane fluid which is useful in preparing the esters employed in the present invention.

The above procedure has been described for the case $R^3$ is preferably methyl. However, the above procedure will apply in the case where $R^3$ is represented by groups other than methyl, such as ethyl, phenyl, etc. More specifically, with respect to the case where $R^3$, $R^4$, and $R^5$ are methyl, $g$ is equal to 2 in Formulas 5, 6 and 8. For example, carboxy-containing methylpolysiloxane can be produced by equilibrating hexamethyldisiloxane with octamethylcyclotetrasiloxane and poly(beta-carboxyethyl)dimethylsiloxane in the proper molar proportions in the presence of 3% of acid treated clay, such as acidified fuller's earth and the reaction mixture is heated for about 5 hours at 100° to 120° C. to remove non-silicone volatiles and to equilibrate the reaction mixture. After about 5 hours of reaction time, when approximately 85% or more of the siloxanes have been converted into the desired carboxy polysiloxanes, the catalyst is removed by filtration and the low molecular weight siloxane can be distilled off to leave a carboxypolysiloxane (I). By using di(beta-carboxyethyl)tetramethyldisiloxane as the chain-stopping unit instead of hexamethyldisiloxane, there can be obtained a linear polysiloxane having carboxy groups at terminal positions of the polymer chain, as well as along the polymer chain. Such a polymer product permits esterification with hydroxy groups at the terminal positions of the polymer chain, as well as positions within the center of the polymer chain.

The carboxyalkyl-containing organopolysiloxanes within the scope of Formula 2 are described and claimed in application Ser. No. 198,725 to Holdstock, filed May 31, 1962, now U.S. 3,182,086 assigned to the same assignee as the present invention. These materials can be readily formed by the hydrolysis and condensation of a mixture of an organotrichlorosilane having the formula:

(10)        R'SiCl₃ a diorganodichlorosilane having the formula:

(11)        R₂SiCl₂ and a cyanoalkyldiorganochlorosilane having the formula:

(12)        R₂Si(Cl)C_gH_{2g}CN where R, R' and $g$ are as previously defined.

During the hydrolysis and condensation of the reactants of Formulas 10 through 12, the various silicon-bonded chlorine atoms are replaced by silicon-bonded hydroxyl groups which intercondense to form siloxane linkages and the nitrile radical hydrolyzes to a carboxyl radical.

The cyanoalkyldiorganochlorosilanes of Formula 12 can be prepared as discussed above concerning the silanes of Formula 6 or can be prepared by effecting reaction between a diorganochlorosilane having the formula:

(13)        R₃SiHCl where R is as previously defined and either acrylonitrile, methacrylonitrile or allyl cyanide in the presence of other catalysts. Processes for producing compositions within the scope of Formula 12 are known in the art and are described, for example, in Pats. 2,906,764, 2,906,765, and 2,913,472. Illustrative of the diorganochlorosilanes within the scope of Formula 13 are dimethylchlorosilane, methylphenylchlorosilane, diphenylchlorosilane, ethylpropylchlorosilane, etc. Products within the scope of Formula 12 which can be prepared by reacting a diorganochlorosilane of Formula 13 with acrylonitrile, methacrylonitrile or allyl cyanide include, for example, dimethyl-beta-cyanoethylchlorosilane, methylphenyl-beta-cyanoethylchlorosilane, diphenyl-gamma-cyanopropylchlorosilane, methylcyclohexyl-beta-cyanopropylchlorosilane, etc. The cyanoalkyldiorganochlorosilanes of Formula 12 are characterized by the fact that the nitrile group is attached to a carbon atom which is at least one carbon atom removed from the silicon, i.e., the cyano group is beta or gamma with respect to the silicon atom.

Illustrative of the organotrichlorosilanes within the scope of Formula 10 and the diorganodichlorosilanes within the scope of Formula 11 which are cohydrolyzed and condensed with the diorganocyanoalkylchlorosilane of Formula 12 are methyltrichlorosilane,
phenyltrichlorosilane,
amyltrichlorosilane,
cyclohexyltrichlorosilane,
benzyltrichlorosilane,
dimethyldichlorosilane,
methylphenyldichlorosilane,
diphenyldichlorosilane,
methylethyldichlorosilane,
methylcyclohexyldichlorosilane, etc.

To form the carboxyalkyl-containing organopolysiloxane of Formula 2, the organotrichlorosilane of Formula 10, the diorganodichlorosilane of Formula 11 and the diorganocyanoalkylchlorosilane of Formula 12 are mixed together in the proportions in which the siloxane units derived therefrom appear in the siloxane of Formula 2. This mixture is then added slowly to water with stirring so as to form a uniform mixture of the organochlorosilanes and water and so as to facilitate the hydrolysis and condensation of the silicon-bonded chlorine atoms and the hydrolysis of the nitrile groups to carboxy groups.

In general, the amount of water employed in the hydrolysis and condensation is sufficient to hyrolyze all of the silicon-bonded chloride atoms and sufficient to provide a solvent for the hydrogen chloride which results from the hydrolysis. Preferably, the amount of water is maintained at a sufficiently low value so as to provide a concentrated hydrogen chloride solution or even to be insufficient to dissolve all of the hydrogen chloride. Where the amount of water is insufficient to dissolve the hydrogen chloride generated, it is desirable to maintain the reaction mixture under pressure, such as a pressure up to about 50 pounds per square inch so as to avoid the loss of hydrogen chloride. In general, the amount of water employed is from about 0.75 to 1.25 parts by weight per part of the mixture of the three organochlorosilanes of Formulas 10 through 12. The hydrolysis and condensation reaction is found to be exothermic and it is found that with control the temperature increases to a maximum in the range of about 70° C. during the course of the hydrolysis and condensation, which is effected in times of from about 1 to 6 hours.

After completion of the hydrolysis and condensation reaction, water and hydrogen chloride are stripped to yield a reaction mixture containing a precipitate of ammonium chloride from the hydrolysis of the nitrile group to the carboxyl group. This precipitate is filtered and the reaction mixture is then dried. In order to insure a uniform composition, the dried and filtered hydolyzate may be equilibrated with sulfuric acid. The conditions under which this equilibration are effected can vary within extremely wide limits. In general, satisfactory results are employed by adding from about 1 to 5% by weight of 86% sulfuric acid to the hydrolyzate and heating the reaction mixture at a temperature of from about 75 to 125° C. for a time of from about 1 to 3 hours. At the end of this time, the reaction mixture is cooled and washed with water until the wash water is neutral. This results in the siloxane composition of Formula 2.

While the method of forming the carboxyalkyl-containing organopolysiloxane of Formual 2 has been described with reference to the hydrolysis and condensation of a mixture of appropriate organochlorosilanes, it should also be pointed out that the product of Formula 2 can also be made by a rearrangement and condensation reaction involving polysiloxanes and alkoxysilanes. More particularly, for example, a composition within the scope of Formula 2 in which R is methyl, R' is phenyl and $g$ is equal to 2, can be prepared by forming a reaction mixture of phenyltriethoxysilane, octamethylcyclotetrasiloxane, 1,3 - bis(beta - carboxy-ethyl)tetramethyldisiloxane and water and heating the reaction mixture in the presence of concentrated sulfuric acid to hydrolyze, condense and equilibrate. The proportions of the various reactants are selected so as to provide the various siloxane units in the ratios desired in the final product within the scope of Formula 2.

When the silane reactant employed in the present invention is of above-described carboxy-containing polysiloxane within the scope of Formulae 1 and 2, the ethers employed are those wherein Z of Formula 3 is —H and are well known in the art.

The polyalkylene glycol monoethers employed in preparing esters used in the practice of the present invention are known in the art. These materials are formed by reacting a monohydric alcohol of the formula $R^2OH$ with an alkylene oxide or a mixture of alkylene oxides. By controlling the reaction conditions during the reaction between the aforementioned monohydric alcohol and the alkylene oxide, the molecular weight of the ethers can be controlled. While any ether within the scope of Formula 3 can be employed in the practice of the present invention, it is preferred that the material contain at least 4 oxyalkylenes units, i.e., $f$ of Formula 3 is equal to at least 4. However, in order to be most effective in the preparation of vinyl chloride polymer foams, it is preferred that the ether have a molecular weight of from about 300 to 5,000. This corresponds generally to products within the scope of formula 3 where $f$ has a value of from about 6 to 100.

As indicated by Formula 3, the ethers employed in the practice of the present invention contain oxyalkylene groups of from 2 to 4 carbon atoms. Included within these oxyalkylene groups are, for example, oxyethylene, oxypropylene-1,2, oxybutylene-1,2-etc. The ether of Formula 3 can contain a number of oxyalkylene groups which can comprise a mixture of various types of oxyalkylene groups. Preferably, the oxyalkylene groups are mixtures of oxyethylene and oxypropylene-1,2, and most preferably mixtures of about 0–70 mole percent oxyethylene and correspondingly 30–100 mole percent oxypropylene-1,2. One very useful ether is the monobutyl ether containing a mixture of oxyethylene and oxypropylene-1,2 groups. Many of the polyalkylene glycol ethers employed in the practice of the present invention are described in Pats. 2,425,755 and 2,448,644. When an oxyethylene group only is present and/or low molecular weight additive is used it requires 1% or more of the additive to control foam. In many cases where the oxypropylene group is 30 to 100 mole percent of oxyalkylene radicals, there can be used about 0.01–0.3% by weight of the additive.

The proportions of the organopolysiloxane of Formulas 1 and 2 and the polyalkylene glycol ether of Formula 3 are selected so that at least 50% and preferably at least 80% of the carboxy groups of the organopolysiloxane within Formulas 1 and 2 are esterified with the ether of Formula 3. The most preferred proportions of the organopolysiloxane within the scope of Formula 2 and the polyalkyleneglycol monoether of Formula 3 are selected so that three molecules of the polyalkyleneglycol monoether of Formula 3 are available for esterification with one molecule of the polysiloxane of Formula 2. By controlling the particular carboxyalkyl-containing organopolysiloxane of Formula 1 or 2 and the particular polyalkylene glycol monoether of Formula 3, the relative proportions of the silicone portion and polyoxyalkylene portion of the ester product are controlled. Preferably, the silicone portion of the copolymers obtained from the polysiloxane of Formula 2 comprises from about 15 to about 60% of the total weight of the copolymer.

These ester reaction products which can be used in the present invention can be prepared by any conventional means of esterification. For instance, the estification reaction may be carried out at room temperature, but the reaction proceeds too slowly at that temperature. Preferably, the reaction temperature is in the range of 70° to 150° C. and more preferably in the range of 70° to 130° C.

Further, although the estification can be carried out without a solvent, it is preferred to add a solvent to the reactants so as to azeotrope out the water of esterification that is formed while the esterification proceeds to completion. Such a solvent may be selected from xylene, toluene, benzene and mineral spirits. The amount of solvent employed may vary within extremely wide limits. Satisfactory results have been obtained by using from about 0.5 to 5 parts of solvent per part of the mixture of the polysiloxane of Formula 1 or 2 and the polyalkyleneglycol monoether of Formula 3.

In addition, the esterification reaction is carried out in the presence of a catalyst. One extremely useful catalyst for the esterification reaction is p-toluene sulfonic acid. The amount of catalyst employed is not critical. Satisfactory results are obtained when employing from about 0.1 to 5% by weight of the catalyst based on the weight of the reaction mixture.

Into the reaction vessel there is added the solvent, then there is added the carboxypolysiloxane and the catalyst. The reaction mixture is then heated above 50° C. with a nitrogen atmosphere and preferably 70° to 130° C. and at this time there is slowly added the ether to the reaction mixture. All of the ether may be added immediately, or it may be added slowly during the course of the reaction. Preferably, one-half of the ether or one-third of the ether is added immediately at the beginning of the reaction and then the rest of the ether is added at subsequent points in the esterification reaction. The water that is formed in the esterification reaction is continually azeotroped with the solvent out of the reaction mixture so as to allow the esterification reaction to proceed to completion. The reaction is continued until the esterification is complete, which, depending upon the reactants and conditions, takes from about 2 to 24 hours or more.

Thus, to allow the reaction to proceed with the continual removal of the water that is formed in the esterification reaction, it is desirable to add one-half of the ether to the reaction mixture at the beginning of the reaction and then after 2 or 3 hours have passed to add the rest of the ether to the reaction mixture. Conversely, the ether can be slowly and continuously added to the reaction pot in over a period of 3 to 7 hours from the initial beginning of the reaction. After esterification is complete, the catalyst is neutralized with sodium bicarbonate and the solution is then filtered and the solvent is distilled from the reaction mixture, resulting in an ester polysiloxane.

Preparation of the organohydrogenpolysiloxane of Formulas 1 and 2 when X is H may be carried out by any of the procedures well known to those skilled in the art.

For example, the polysiloxanes of Formulas 1 and 2 can be produced by an equilibration employing an acid polymerization catalyst. For instance to produce a hydrogenpolyorganosiloxane which can be employed in the present case which is used in reaction with the ether of Formula 3, hexamethyldisiloxane is equilibrated with octamethylcyclotetrasiloxane and tetramethyltetrahydrogencyclotetrasiloxane in the proper molar proportion, in the presence of 3% of acid-treated clay, such as 3% acid on fuller's earth and the reaction mixture is heated for 5 hours at 100° to 120° C. to equilibrate the reaction mixture. After 5 hours of reaction time, when approximately 85% or more of the tetramers have been converted to the polymer polysiloxane, the catalyst is filtered off and the volatile siloxanes are distilled off to leave a substantially pure polyorganosiloxane containing SiH bonds. By using dihydrogentetramethyldisiloxane as the chain-stopping unit instead of hexamethyldisiloxane, there can be obtained a linear polysiloxane having hydrogen groups at the terminal positions of the polymer chain, as well as along the polymer chain. In place of the cyclicmethylsiloxanes in the above process, there can be used cyclicorganopolysiloxanes where organo groups are selected from alkyl, cycloalkyl, aryl radicals as well as other types of radicals.

When the silicone reactant employed in the present invention is of the above-described organohydrogenpolysiloxane within the scope of Formulas 1 and 2, the ethers employed are those wherein Z of Formula 3 is

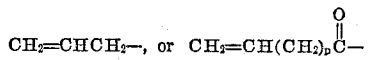

where $p$ is 0 to 18, and methods of prepartion are known in the art. For instance, acrylic acid and an ether of the formula $HO-(C_nH_{2n}O)_fR^2$ wherein $f$, $n$ and $R^2$ have the same meanings as discussed above, are reacted to form an ester of the formula

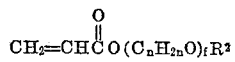

The esterification reaction is preferably carried out in the presence of a catalyst which may be a strong acid such as sulfuric acid, hydrochloric acid or nitric acid. Preferably, the catalyst is sulfuric acid or toluene sulfonic acid. Although the reaction may be carried out at room temperature, it has been discovered that the esterification reaction proceeds too slowly at that temperature. Preferably, the reaction temperature is in the range of 50° to 150° C. and more preferably in the range of 70° to 130° C. The reaction is allowed to proceed for 2 to 15 hours. and preferably from 5 to 10 hours. Further, the esterification reaction is preferably carried out in the presence of an inert solvent selected from toluene and xylene, benzene, mineral spirits and other inert solvents under nitrogen atmosphere. After the reaction has proceeded to completion, that is after the reaction period of 5 to 10 hours, the acid is neutralized with sodium bicarbonate and additional inert solvent is added to the reaction mixture. Then the organic layer is washed with water and the resulting organic layer is separated from the aqueous layer that forms. Then when boiling point allows, the ester is distilled from the organic layer by distillation procedure so as to separate out the pure ester material. When the boiling point is too high, other procedures must be sought for purification or a crude ester used.

To produce the desired reaction products employed in the present invention, the above ethers wherein Z is

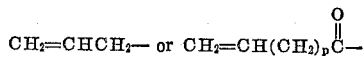

are reacted with the silicone of Formula 1 or 2 wherein X is H, in the presence of a platinum catalyst to effect the SiH-olefin addition reaction. For instance, the hydropolysiloxane is mixed with toluene, and the mixture is heated to a temperature in the range of 100° to 150° C. to remove any free water by toluene-water azeotrope. Once the solution of the hydropolysiloxane and the toluene is dried in accordance with the azeotrope technique, a trace of platinum catalyst is added to the mixture. Then the olefinically unsaturated ether is slowly added to the reaction pot. The addition is exothermic so the temperature is controlled by the olefin addition rate and is usually maintained in the range of 25°–75° C. During the reaction, the SiH peak disappearance is followed by infrared scan. Once the addition of ether to silicon hydride is completed, the solution is filtered through fuller's earth to help remove platinum compounds. Then the solution is stripped to remove solvents and low boiling fractions to yield a suitable polysiloxane reaction product. By the rate of the addition of the ether, the temperature is able to be controlled in the range of 25° to 100° C. and, more preferably, in the range of 25° to 75° C.

A suitable catalyst for addition of organohydrogenpolysiloxane to the olefinically unsaturated ether are the various platinum and platinum compound catalysts known in the art. These catalysts include elemental platinum in the finely divided state which can be deposited on charcoal or alumina, as well as various platinum compounds such as chloroplatinic acid, the platinum hydrocarbon complex of the type shown in U.S. Pats. 3,159,601, 3,159,-662, as well as the platinum alcoholic complexes prepared from chloroplatinic acid which are described and claimed in Lamoreaux U.S. Pat. 3,220,972. Preferably, the platinum catalyst is added to the organohydrogenpolysiloxane located in the reaction chamber to which is also added a solvent and then the ether is slowly added to the reaction mixture at the reaction temperatures described above. Whether elemental platinum or one of the platinum complex catalysts is used, the catalyst is generally used in amounts sufficient to provide about $10^{-4}$ to $10^{-6}$ moles of platinum per mole of the unsaturated ether reactant. As mentioned previously, the reaction is effected by adding the organohydrogenpolysiloxane to an inert solvent such as inert solvents being selected from the group of benzene, toluene, xylene, mineral spirits and other inert solvents. The reaction mixture is preferably azeotroped dry then adjusted to about 50–75° C. before the addition of the ether. The unsaturated ether is then added to the hydrogenpolysiloxane solvent mixture at an addition rate so as to maintain the reaction temperature in the range of 25° to 75° C. during the reaction. Preferably, the reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When the desired amount of the SiH organopolysiloxane has been converted to the reaction product, the reaction mixture may be cooled and the reaction may be considered to have proceeded to a sufficient extent for the conversion to the polysiloxane reaction product.

The preferred reaction products employed in the present invention are the esters represented by the formulas:

(9) 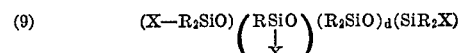

(10) 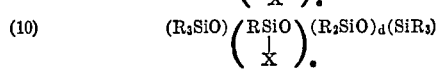

where X is

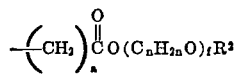

and

(11) 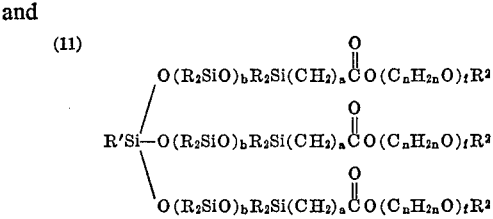

wherein R, R', $R^2$, $a$, $b$, $n$, and $f$ have the same meanings as defined above.

Usually, these silicone reaction products are employed in the plastisols of the present invention in amounts ranging from about 0.01 to about 2% by weight of the vinyl chloride polymer, and preferably from about 0.03 to about 1% by weight of the vinyl chloride polymer.

The preferred quantity of any particular polysiloxane to be employed will depend upon the efficacy of the specific polysiloxane, and its compatibility with the plastisol composition and particularly with the vinyl chloride polymer and any surfactant residues which may be present on the specific resin from its emulsion polymerization processing.

A convenient method to select the most effective silicone stabilizer as well as determine the most effective concentration level for a particular system is to first determine the "over-blow" conditions of the particular plastisol system. This can be done by plotting a series of density-time curves for curing the specific foam system involved, using step-wise increments of blowing agent, until a density area is found where "over-blow" occurs, before blowing is complete. Most properly designed simple plastisols should cure to produce 15–20 lb./ft.³ foam, giving complete blow without encountering an "over-blow" condition. Below 8–10 lb./ft.³ density, however, "over-blow" becomes common before complete blowing of the blowing agent occurs.

When the "over-blow" region has been determined, add silicone stabilizer to the plastisol (beginning at 0.1% for the initial run) and plot the density time curve for the silicone-containing plastisol into the previously determined "over-blow" region. Examine foam samples to compare quality of foam. Repeat as required to determine the most effective level of silicone for the foam stabilization required.

In addition, it has been observed that the polysiloxane copolymers employed in this invention appear to be most effective for those plastisols which still retain the blowing gas at "overblown" conditions, that is, the foams produced will remain stable or decrease in apparent density even though the interior cell structure begins to collapse.

When the compositions of the present invention are ready to be blown, a chemical blowing agent, in an amount usually between about 2% and about 20% by weight of the vinyl chloride polymer, is present in the plastisol. The chemical blowing agent releases a gas in the polymer composition under the desired conditions and thereby causes foaming. The blowing agent generally should be activated above the temperature at which gelling of the polymer composition takes place. Preferably, the chemical blowing agent is one which effects blowing in the "hot melt" stage of the plastisol, at a temperature range of about 140° to 200° C. depending on the formulation. It may be a blowing agent of the type which generates gas by decomposition, for example, azodicarbonamide, dinitrosodimethylterephthalamide, or sodium or ammonium carbonates or bicarbonates, or it may include an inert substance which effects blowing by vaporization such as xylene or perchloroethylene.

The vinyl chloride polymer plastisol may contain various additives such as heat and light stabilizers and blowing agent activators. In addition, since the polysiloxane employed in this invention may slightly delay the evolution of the gas from a blowing agent, such as azodicarbonamide, it may be desirable to add an extra increment of a suitable activator to restore the blowing rate. Suitable stabilizers and activators are complexes of barium, zinc, cadmium, lead, tin and calcium salts of fatty acids. Other stabilizers that may be used are Paria 10 manufactured by the Rheinhold Chemical Co., Vanstay HTA manufactured by the Vanderbilt Co., Ferro 5730 manufactured by the Ferro Chemical Co., Nuodex V–1048 maufactured by Tenneco Chemical Co., Advance BC–72, Advance T–5, Advance Liquid T–150 manufactured by the Advance Chemical Co., and Dyphos paste manufactured by National Lead Co. Generally, such stabilizers are incorporated 0.4% by weight of the plastisol composition and preferably 1–3% by weight.

There may also be included in the plastisol composition fillers, pigments and extenders. Suitable fillers are calcium carbonate, barytes and mica. In this case, low oil absorbing fillers are preferred. Generally, the stabilizers with the fillers and extenders comprise 0–50% by weight of the plastisol composition and preferably 0–30% by weight to achieve the best foam structure.

The plastisol may be prepared by mixing the ingredients by any suitable mixing method, for example, by milling in a roller mill, by stirring with a paddle type stirrer, or by kneading in an internal mixer.

The plastisol composition is then subjected to elevated temperatures to cause gelation, fusing of the plastisol and expansion to form the desired cellular structure. The elevated tempertaure at which the foam must be generated depends upon the types and proportions of vinyl chloride polymers and plasticizers employed, as well as the thickness and density of the composition. In general, after the plastisol has been spread or poured into the desired configuration or mold, it is heated at a temperature in the range of 270°–450° F. for from about 30 seconds to about 30 minutes to gel, fuse and expand the plastisol. Gelation can be effected as a separate step; then the gelled plastisol can be later fused and expanded by heating it at a temperature in the range of 300–450° F. for from about 30 seconds to about 30 minutes. Preferably, gelation fusion and expansion are carried out in a single heating step so that in general the plastisol is rapidly heated to 330–400° F. for 2 to 12 minutes to complete the operation. After the heating step, the foam is cooled to room temperature to yield a flexible faom material having uniform sized cells. Depending on the amount of blowing agent that has been incorporated into the plastisol, foam densities may vary over a wide range from below 5 pounds per cubic foot to about 50 pounds per cubic foot. The foams produced according to this invention are particularly suitable as carpet or fabric backings, gaskets and seals, and cushioning materials.

The following examples are used to illustrate the invention and are not intended to limit the invention in any way. All parts are by weight unless specified otherwise.

EXAMPLE A

To about 3,000 parts of water are slowly added with stirring a mixture of 150 parts methyltrichlorosilane, 2,600 parts dimethyldichlorosilane and 480 parts di methyl - gamma - cyanopropylchlorosilane. The reaction mixture is maintained at a temperature of about 70° C. for two hours. The reaction mixture is then allowed to cool to room temperature and filtered to remove precipitated ammonium chloride and then heated at a temperature of about 110° C. to dry the reaction mixture. At this time, 100 parts of 87% sulfuric acid are added to the reaction mixture which is maintained for 2 hours at 100° C. At the end of this time, the reaction mixture is repeatedly washed with water until the wash water is neutral, dried with anhydrous sodium sulfate, and filtered. This results in gamma-carboxypropyl-containing organopolysiloxanes within the scope of Formula 2 having the formula:

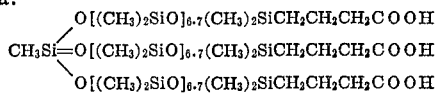

An ester within the scope contemplated in the present invention is prepared by mixing 195 parts of the previously prepared organopolysiloxane, 200 parts toluene, 10 parts p-toluene sulfonic acid and 450 parts of the monobutylether of a mixed polyethyleneoxypolypropyleneoxy-1,2 glycol containing 50 weight percent oxyethylene groups and 50 weight percent oxypropylene groups and having a molecular weight of about 1,500. This reaction mixture is heated under nitrogen for about 8 hours at the reflux temperature of the toluene solvent, and water is trapped from the distillate as formed. The resulting product is cooled, neutralized with sodium bicarbonate and filtered to remove solids. The reaction mixture is then heated to a temperature of about 150° C. at 10 millimeters to distill the toluene and low molecular weight siloxanes, resulting in a copolymer within the scope of the present invention which is a clear, pale yellow fluid having a viscosity of about 920 centipoises at 25° C. and which corresponds to the formula:

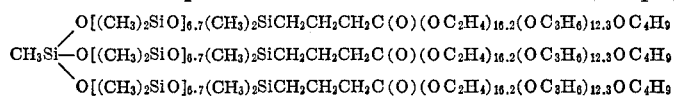

EXAMPLE B

Following the procedure of Example A, an ester copolymer within the scope of the present invention is prepared by reacting 195 parts of the carboxypropylpolysiloxane of Example A with a mixture of polyalkylene glycol monobutylethers having an average molecular weight of about 1800 in the presence of 500 parts toluene and 4 parts p-toluene sulfonic acid. The mixture of monobutylethers is a mixture of a 70% by weight first monobutylether of a mixed polyethyleneoxy-polypropyleneoxy-1,2 glycol having a molecular weight of about 1300 and a 30% by weight second monobutylether of a polyethyleneoxy-polypropyleneoxy-1,2 glycol having a molecular weight of about 2700. The resulting material is a yellow liquid having a viscosity of about 1000 centipoises at 25° C. and corresponds to the average formula:

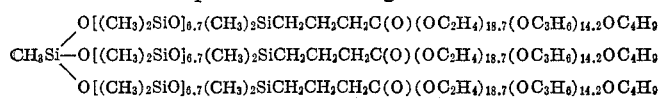

EXAMPLE 1

100 parts of a vinyl chloride polymer commercially available from Monsanto under the trade designation Opalon R–7611; 95 parts of a monomeric epoxy plasticizer having a molecular weight of 420, an acid number of 0.4, saponification number of 185, viscosity of 0.9 poise at 25° C., and specific gravity of 0.945 and commercially available under the trade designation Monoplex S–75; 5 parts of Paraplex G–62, an epoxidized soybean oil plasticizer having a molecular weight of 1000, an acid number of 4, saponification number of 183, viscosity of 3.4 poises at 25° C., and specific gravity of 9.993; 10 parts of azobisformamide, 2.5 parts of a heat stabilizer (Vanstay RRZ Mark 586), and 0.2 part of the polysiloxane copolymer of Example A are mixed together and thoroughly stirred. The mixture is then coated on 25 mil thick aluminum sheets to provide a 50 mil thick wet film. The coated plates are heated in an oven at 420° F. for 3 minutes. A cellular structure having a density of 6 lbs./ft.³ and having uniform and small cells and good surface appearance is obtained.

This example is repeated except that no polysiloxane is employed. The product is an "overblown" cellular structure having large irregular cells.

EXAMPLE 2

Example 1 is repeated except that the 0.2 part of polysiloxane of Example A are replaced with 0.2 part of the polysiloxane of Example B. The cellular structure obtained has uniform and small cells, a density of about 5 lbs./ft.³, and good surface appearance.

EXAMPLE 3

Example 1 is repeated except that the 0.2 part of the polysiloxane copolymer of Example A are replaced with 0.2 part of a polysiloxane copolymer of the following average formula:

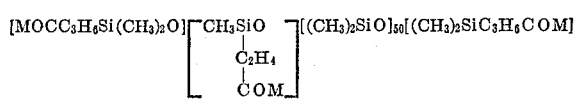

wherein M is —(OC₂H₄)₂₉.₉(OC₃H₆)₂₂.₇OC₄H₉. The cellular structure obtained has uniform and small cells, a density of 5–6 lbs./ft.³, and good surface appearance.

EXAMPLE 4

Example 1 is repeated except that the 0.2 part of the polysiloxane copolymer of Example A are replaced with 1.0–2.0 parts of a polysiloxane copolymer of the following average formula:

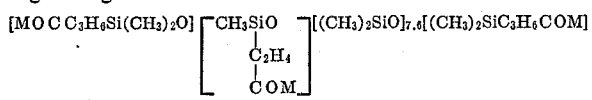

wherein M is —(OC₂H₄)₂₉.₉(OC₃H₆)₂₂.₇OC₄H₉. The cellular structure obtained has uniform and small cells, a density of 5–6 lbs./ft.³, and good surface appearance.

EXAMPLE 5

100 parts of a vinyl chloride polymer commercially available from Monsanto under the trade designation Opalon R–7611; 93 parts of dioctylphthalate; 5 parts of Paraplex G–62, 8 parts of azobisformamide, 3.0 parts of a heat stabilizer (Mark 586), and 0.5 part of the polysiloxane copolymer of Example A are mixed together and thoroughly stirred. The mixture is then coated on 25 mil thick aluminum plates to provide a 50 mil thick wet film. The coated plates are heated in an oven at 380° F. for 3.7 minutes. A cellular structure having a density of 6–7 lbs./ft.³ and having uniform and small cells and good surface appearance is obtained.

This example is repeated except that no polysiloxane is employed. The product is an "overblown" cellular structure having large irregular cells.

EXAMPLE 6

Example 5 is repeated except that the 0.5 part of the polysiloxane copolymer of Example A is replaced with 0.2 part of the polysiloxane copolymer of Example B. The cellular structure obtained has uniform and small cells, a density of 6–7 lbs./ft.³, and good surface appearance.

EXAMPLE 7

Example 5 is repeated except that the 0.5 part of the polysiloxane copolymer of Example A is replaced with 0.2 part of a polysiloxane copolymer of the following average formula:

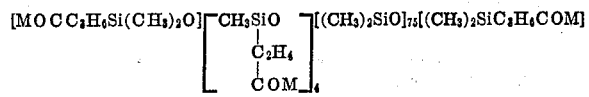

wherein M is —(OC₂H₄)₁₂.₃(OC₃H₆)₇₆.₂OC₄H₉. The cellular structure obtained has uniform and small cells, a density of 6–7 lbs./ft.³, and good surface appearance.

EXAMPLE 8

100 parts of a vinyl chloride polymer commercially available under the trade designation Exon 605; 75 parts of dioctylphthalate; 5 parts of Paraplex G-62, 8 parts of azobisformamide, 3.0 parts of a heat stabilizer (Mark 586), and 0.1 part of the same polysiloxane copolymer employed in Example 3 are mixed together and rapidly stirred. The mixture is then coated on 25 mil thick aluminum plates to provide a 50 mil thick wet film. The coated plates are heated in an oven at 385° F. for 3.3 minutes. A cellular structure having a density of 6–7 lbs./ft.³ and having uniform and small to medium closed cells and good surface appearance is obtained.

This example is repeated except that no polysiloxane is employed. The product is an "overblown" cellular structure having large irregular cells.

EXAMPLE 9

Example 8 is repeated except that the 0.1 part of the polysiloxane copolymer of Example 8 is replaced with 0.3 part of the full ester obtained from

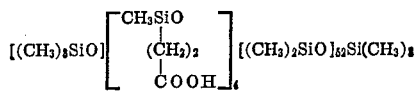

and mixture of polyethers containing about 1.3 propylene oxide units per ethylene oxide unit by weight and obtained from a blend of equal parts of Ucon HB 2000, Jefferson GE 21 and WL 850 A. The cellular structure obtained has uniform and small to medium closed cells, a density of 6–7 lbs./ft.³ and good surface appearance.

What is claimed is:

1. A composition which is capable of being chemically blown to produce a uniformly sized cellular structure having a density below 10 lbs./ft.³, said composition comprising a vinyl chloride polymer, a plasticizer uniformly mixed with the polymer and a silicone polymer uniformly mixed with said vinyl chloride polymer and said plasticizer, wherein said silicone polymer is the reaction product of (A) silicone reactant selected from the group of (1) 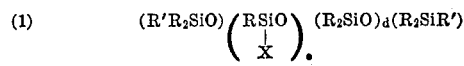

and (2) 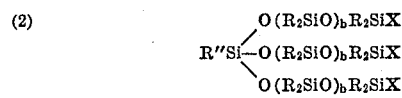

wherein X is selected from the group of H, and (CH₂)ₐCOOH; R' is the same as X or is a monovalent organic radical provided that Formula 1 contains at least three H or (CH₂)ₐCOOH units directly bonded to Si atoms; wherein each R and R" individually is a monovalent organic radical; $a$ is an integer from 1 to 20, inclusive; $b$ has a value of at least 2; $d$ is an integer from about 5 to about 200, inclusive; $e$ is at least 1, and the ratio of $e/d$ is about 0.002 to about 0.3; with (B) an ether having the formula:

$$ZO(C_nH_{2n}O)_fR^2$$

wherein Z is H when X is (CH₂)ₐCOOH, and is CH₂=CHCH₂— or

when X is H; R² is lower alkyl radical; $f$ has a value of at least 5; $n$ has a value of from 2 to 4 inclusive; and $p$ is 0 to 18.

2. The composition of claim 1 which contains about 0.01 to about 2 parts of said silicone polymer per 100 parts of said vinyl chloride polymer.

3. The composition of claim 1 wherein X is (CH₂)ₐCOOH and Z is H.

4. The composition of claim 2 wherein said silicone polymer is the reaction product of a silicone reactant of the formula:

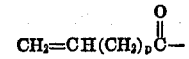

5. The composition of claim 4 wherein R' is (CH₂)ₐCOOH.

6. The composition of claim 4 wherein R' is CH₃ and $e$ is at least 3.

7. The composition of claim 4 wherein said ether contains ethylene oxide units and propylene oxide units in the molar ratio of 0 to 3.

8. The composition of claim 2 wherein said silicone polymer is the reaction product of silicone reactant of the formula:

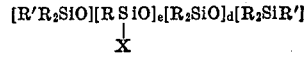

9. The composition of claim 8 wherein said ether contains ethylene oxide units and propylene oxide units in the molar ratio of 0 to 3.

10. The composition of claim 1 wherein R and R" are methyl and $a$ is 2 or 3.

11. The composition of claim 1 which contains about 2 to about 20% by weight of a blowing agent.

12. The composition of claim 1 wherein at least 50% of the reactive X groups are reacted with the polyether.

13. The composition of claim 1 wherein at least 80% of the reactive X groups are reacted with the polyether.

14. A process for preparing a polyvinyl foam having a uniform cellular structure, said process comprising mixing a vinyl chloride polymer with a plasticizer, then adding to the mixture a silicone polymer wherein said silicone polymer is the reaction product of (A) silicone reactant selected from the group of (1) 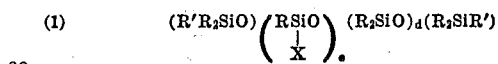

and (2) 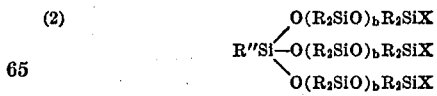

wherein X is selected from the group of H, and (CH₂)ₐCOOH; R' is the same as X or is a monovalent organic radical provided that Formula 1 contains at least three H or (CH₂)ₐCOOH units directly bonded to Si atoms; wherein each R and R' individually is a monovalent organic radical; $a$ is an integer from 1 to 20, inclusive; $b$ has a value of at least 2; $d$ is an integer from about 5 to about 200, inclusive; $e$ is at least 1, and the ratio of $e/d$ is about 0.002 to about 0.3; with (B) an ether having the formula:

$$ZO(C_nH_{2n}O)_fR^2$$

wherein Z is H when X is $(CH_2)_aCOOH$, and is $CH_2=CHCH_2-$ or

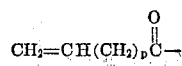

when X is H; $R^2$ is lower alkyl radical; $f$ has a value of at least 5; $n$ has a value of from 2 to 4, inclusive, and $p$ is 0 to 18, and then foaming said mixture with a gas.

15. The process of claim 14 which further comprises adding about 2 to about 20% by weight of a blowing agent.

16. The process of claim 14 wherein at least 80% of the reactive X groups are reacted with the ether.

17. The process of claim 14 wherein said foam has a density of below 10 lbs./ft.³

References Cited

UNITED STATES PATENTS

| | | | |
|---|---|---|---|
| 3,582,391 | 6/1971 | Keil | 260—2.5 P |
| 3,511,788 | 5/1970 | Keil | 260—2.5 P |
| 3,271,331 | 9/1966 | Ender | 260—2.5 P |
| 3,182,076 | 5/1965 | Holdstock | 260—2.5 A |

MURRAY TILLMAN, Primary Examiner

M. FOELAK, Assistant Examiner

U.S. Cl. X.R.

260—30.6 R, 31.8 HA, 46.54, 33.25 B, 46.5 H, 827, 448.2 B, 448.2 H